United States Patent [19]

Yamamori et al.

[11] Patent Number: 4,851,863

[45] Date of Patent: Jul. 25, 1989

[54] INK JET RECORDING APPARATUS WITH A DEVICE FOR REMOVING INK ATTACHED TO AN INK JET HEAD

[75] Inventors: Kiyoshi Yamamori, Yokohama; Kimikatsu Satoh, Kawasaki; Shigeyoshi Hasegawa, Kanagawa; Sadashi Higuchi, Kawasaki, all of Japan

[73] Assignee: Matsushita Electric Industrial Co., Ltd., Osaka, Japan

[21] Appl. No.: 225,666

[22] Filed: Jul. 29, 1988

Related U.S. Application Data

[63] Continuation of Ser. No. 43,726, Apr. 29, 1987.

[30] Foreign Application Priority Data

May 8, 1986 [JP] Japan ............................ 61-105241
Jun. 5, 1986 [JP] Japan ............................ 61-130765

[51] Int. Cl.[4] ........................................ G01D 15/16
[52] U.S. Cl. ........................................ 346/140 R
[58] Field of Search ........................................ 346/140

[56] References Cited

U.S. PATENT DOCUMENTS 4,015,272 3/1977 Yamamori ........................ 346/140
4,112,435 9/1978 Kattner ........................ 346/140
4,317,124 2/1982 Shirato ........................ 346/140

FOREIGN PATENT DOCUMENTS 53-102036 9/1978 Japan .
56-89951 2/1981 Japan .
60-192674 1/1985 Japan .

*Primary Examiner*—Joseph W. Hartary
*Attorney, Agent, or Firm*—Pollock, VandeSande & Priddy

[57] ABSTRACT

Disclosed is an ink jet recording apparatus of the type wherein printing ink is discharged from an ink nozzle of an ink jet printing head toward recording paper wrapped around a drum. The ink jet recording apparatus comprises first and second plates placed to be spaced each other and an ink droplet guiding member one end of which is placed in contact with a lower portion of the front surface of the ink jet printing head, the second plate acting as a member for supporting the ink jet printing head. The first plate has an aperture so that the other end of the ink droplet guiding member reaches the second plate through the aperture of the first plate. With this arrangement, ink attached to the surface of the ink jet printing head can be removed by flowing down through the ink droplet guiding member and the second plate.

6 Claims, 5 Drawing Sheets

INK JET RECORDING APPARATUS WITH A DEVICE FOR REMOVING INK ATTACHED TO AN INK JET HEAD

This application is a continuation, of application Ser. No. 43,726, filed Apr. 29, 1987.

BACKGROUND OF THE INVENTION

The present invention relates generally to ink jet recording apparatus of the type where printing ink is discharged from an ink jet printing head toward a writing surface, and more particularly to such an ink jet recording apparatus having a device for quickly removing stagnant ink produced on an ink jet printing head due to ink-mist.

Generally, known is ink jet recording apparatus of the type in which one or a plurality of ink jet printing heads are arranged in close vicinity to recording paper wrapped around a drum as illustrated, for example, in Japanese Patent Provisional Publication No. 53-102036. There is a problem which arises with such an ink jet recording apparatus, however, in that stagnant ink is produced on an ink jet printing head and so on due to ink-mist generated during discharging of printing ink and the produced stagnant ink possibly causes stain of the recording paper. Therefore, it would be required to quickly remove the produced stagnant ink. Furthermore, if the ink jet printing head is cleaned after termination of the recording, it is required that the water used for the cleaning is quickly removed without staying on the ink jet printing head and so on.

SUMMARY OF THE INVENTION

It is therefore an object of the present invention to provide an arrangement of an ink jet recording apparatus which is capable of preventing generation of the stagnant ink and quickly removing the generated stagnant ink and the cleaning water.

According to a feature of the present invention, the ink jet recording apparatus comprises an ink droplet guiding member one end of which is placed in contact with a lower portion of the front surface of an ink jet printing head and the other end of which extends downwardly. Therefore, stagnant ink produced on the ink jet printing head, due to ink-mist, drops down through the ink droplet guiding plate.

Preferably, the ink jet recording apparatus further comprises first and second plates spaced from each other, the second plate acting as a member for holding the ink jet printing head. The first plate has an aperture so that the other end of the ink droplet guiding member reaches the second head-supporting plate through the aperture of the first plate. With this arrangement, ink attached to the surface of the ink jet printing head can be removed by flowing down through the ink droplet guiding member and the space defined between first and second plates.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
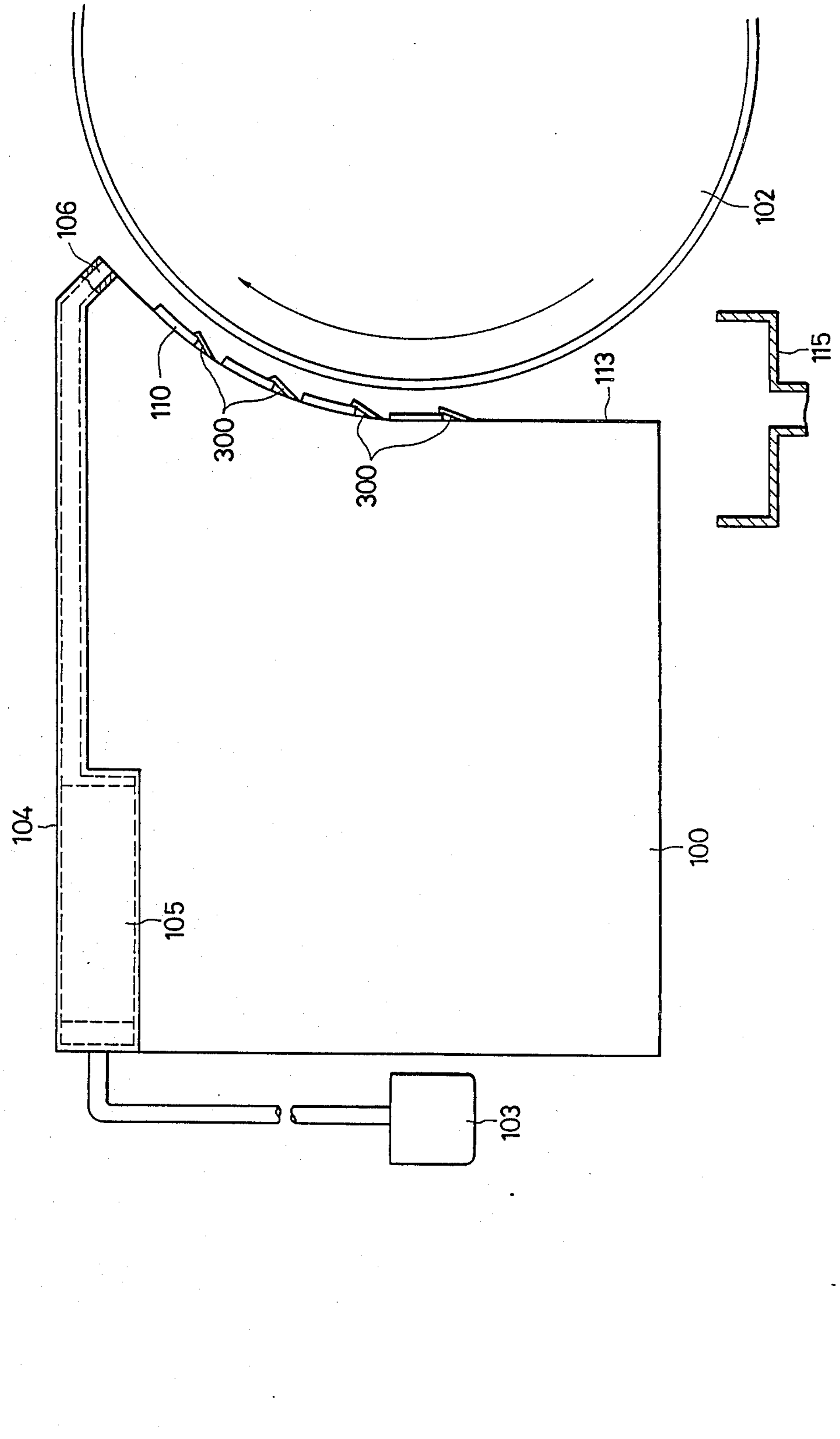
FIG. 1 is a side view of the principal portion of an ink jet recording apparatus according to a first embodiment of the present invention.
Figure 2:
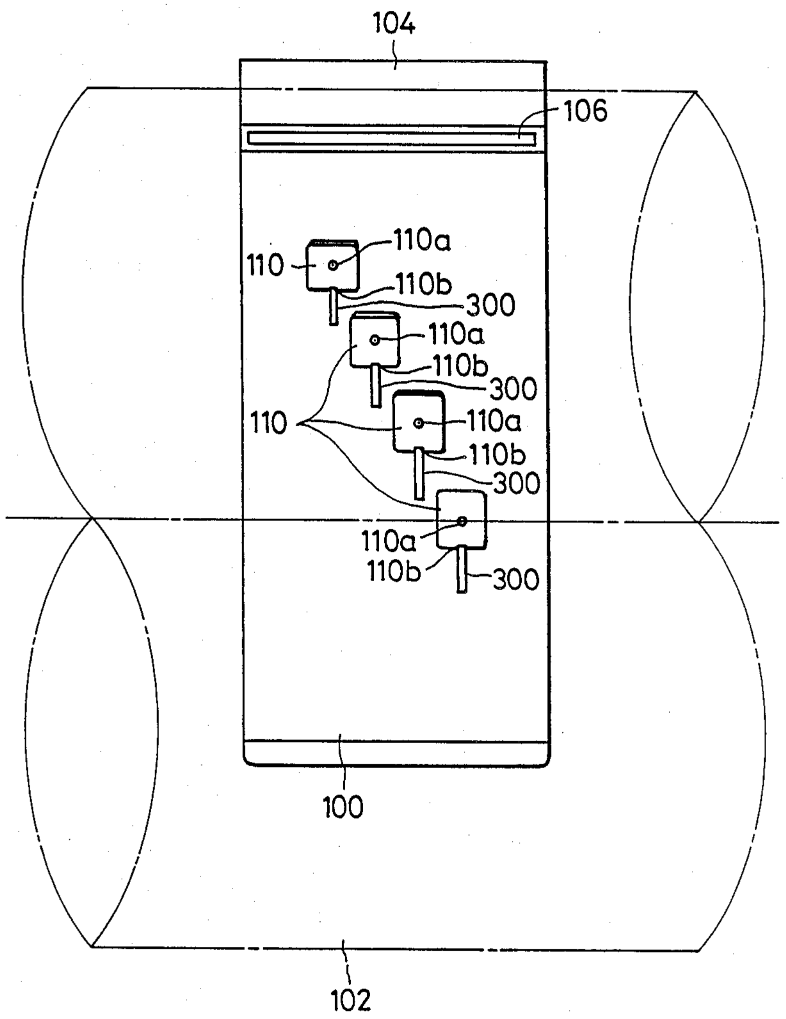
FIG. 2 is a front view of the apparatus of FIG. 1.

Referring now to FIG. 1, there is schematically illustrated the principal portion of an ink jet recording apparatus according to a first embodiment of the present invention which comprises an ink jet printing unit 100 for printing ink on recording paper and a drum around which the recording paper is wrapped. FIG. 2 is a front view of the apparatus of FIG. 1. The ink jet printing unit 100 is arranged to be driven by a drive unit, not shown, in the directions parallel to the axis of the drum 102. The ink jet printing unit 100 includes a plurality of ink jet printing heads 110 supported by a head-supporting plate 113 for discharging of printing ink toward a writing surface of the recording paper and an ink-mist suction device 104 for sucking ink-mist existing around the ink jet printing heads 110. The ink-mist suction device 104 comprises an air suction means 103, a filter 105 and a mist suction inlet 106, the ink-mist being sucked from the mist suction inlet 106 by the aid of the air suction means 103 and the sucked ink-mist being caught by the filter 105 after passing through a mist passage establishing communication between the filter 105 and the mist suction inlet 106.

According to this embodiment, further included in the ink jet recording apparatus are ink droplet guiding plates 300, one end of each of which is mounted on, or placed in contact with, an ink discharging nozzle 110*a* of each of the heads 110 or a lower portion 110*b* of the surface of each of the heads 110 confronting the peripheral surface of the drum 102 and the other end thereof is mounted on, or placed in contact with, a surface of the head-supporting plate 113. The surfaces of ink droplet guide plates 300 are half-etched.

Operation of the above-described apparatus is as follows.

At the time of no operation of the apparatus, the ink jet printing unit 100 is placed at a predetermined position and the ink jet printing heads 110 are humidified with they being covered by a clogging prevention device, not shown. In response to turning-on of a power supply for the apparatus, the cover is taken away from the ink jet printing heads 110 by means of the clogging prevention device. Thereafter, by operation of an air supply device (not shown) pressurized air is supplied into the ink jet printing unit 100 so as to keep the pressure within the ink jet printing unit 100 to a predetermined pressure value. In response to application of a recording start signal after recording paper is wrapped around the drum 102, the drum 102 is rotated in one direction at a constant speed and the ink jet printing unit 100 is moved up to the recording start position, and recording is then started in accordance with a picture signal. Concurrently, the air suction means 103 is operated in synchronism with the picture signal so that air is sucked from the mist suction inlet 106, it being driven until the recording is terminated. Ink-mist produced during discharging of ink droplets for recording is sucked together with the air from the mist suction inlet 106 and is catched by the filter 105. The ink-mist attached to the nozzle surfaces of the ink jet printing heads 110 runs down through the respective ink guide plates 300 to the head-supporting plate 113, each of guide plates 300 being provided such that one end portion thereof comes into contact with a lower portion 110*b* of the drum-confronting surface of each of the printing heads 110 or a lower portion of the front surface of the ink discharging nozzle 110*a* of each of the printing heads 110 and the other end portion of which comes into contact with the head-supporting plate 113. This arrangement prevents the generation of convex stagnant ink on the surfaces of the printing heads 110 and the surfaces of the ink discharging nozzles 110*a*, resulting in prevention of attachment of the convex stagnant ink to the recording paper.

After termination of recording, the ink jet printing unit 100 is moved away from the drum 102 and up to a predetermined position facing a head cleaning device, not shown, where it is washed with spraying of cleaning water. At this time, the stagnant cleaning water attached on the surfaces of the ink jet printing heads 110 can be removed by the aid of the guide plates 300. If the guide plates 300 and the head-supporting plate 113 are half-etched, the removal effect of water and ink becomes greater because of easy flowing-down of ink. The sprayed water against the ink jet printing heads 110 is received by a waste liquid receiver 115. After termination of the cleaning, the ink jet printing unit 100 is returned to a predetermined position.

Figure 3:
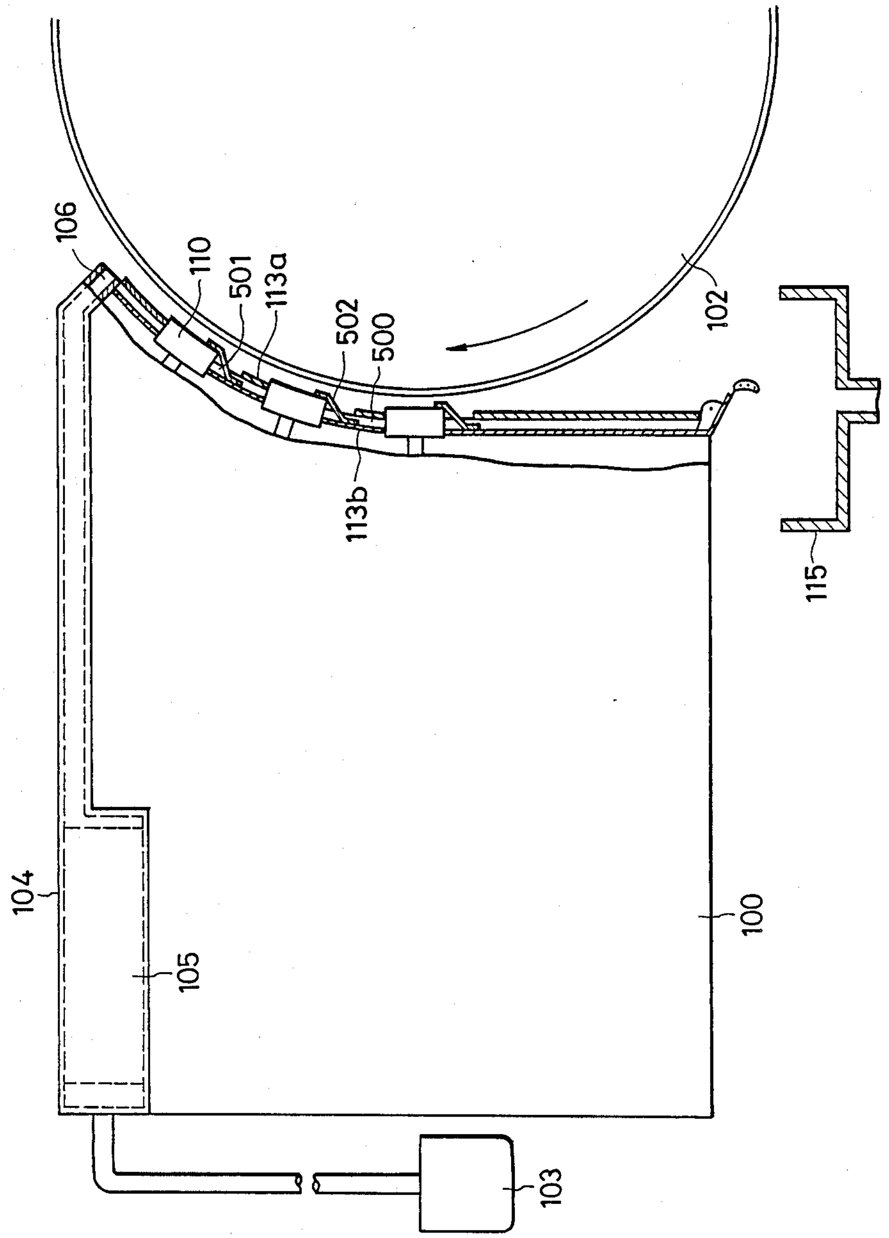
FIG. 3 is a side view of the principal portion of an ink jet recording apparatus according to a second embodiment of the present invention.
Figure 4:
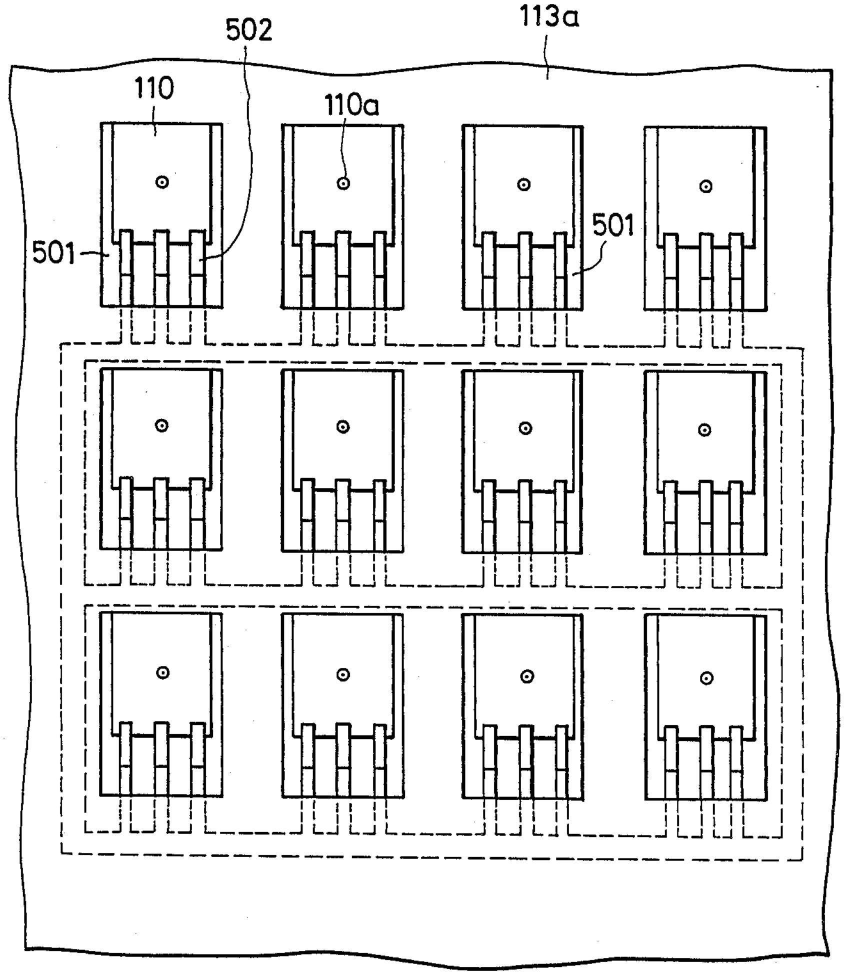
FIG. 4 is a front view of the principal portion of the apparatus of FIG. 3.

FIGS. 3 and 4 are illustrations of an ink jet recording apparatus according to a second embodiment of the present invention, FIG. 3 being a side view of the principal portion of the ink jet recording apparatus and FIG. 4 being a front view thereof, where parts corresponding to those in FIGS. 1 and 2 are marked with the same numerals.

In FIGS. 3 and 4, illustrated at 113*a* and 113*b* are first and second plates which are provided to be in parallel to each other and to face the drum 102, the second plates 113*b* acting as a head-supporting plate for holding ink jet printing heads 110. A spacing defined between the first and second plates 113*a* and 113*b* acts as an ink-flowing passage 500 for guiding ink to a waste liquid receiver 115. The first plate 113*a* has a plurality of openings or apertures 501, each being defined such that each of the ink jet printing heads 110 can be exposed to confront the drum 102. Also included in the second embodiment apparatus are a plurality of ink droplet guiding plates 502, each of which extends from each of the ink jet printing heads 110 through each of the apertures 501 to the second head-supporting plate 113*b*, that is, one end of each of the ink droplet guiding plates 502 is placed in contact with a lower portion of the front surface (confronting a drum 102) of each of the ink jet printing heads 110 and the other end thereof is placed in contact with the second head-supporting plate 113*b*. Therefore, ink caused by ink-mist attached to the ink jet printing heads 110 flows down through the ink droplet guiding plates 502 and the ink-flowing passage 500 to the waste liquid receiver 115. Cleaning water used for cleaning the ink jet printing heads 110 similarly flows down through the ink removal passage comprising the ink droplet guiding plates 502, apertures 501 and ink-flowing passage 500 to the waste liquid receiver 115.

According to this arrangement, because of quick removal of stagnant ink generated on the surface of the ink jet printing heads 110, even if a number of the ink jet printing heads 110 are matrix-located, it is possible to prevent the recording paper from being strained due to the fact that ink droplets generated on the upwardly positioned head 110 drop on the downwardly positioned head 110*a* and are then blown off by the discharging nozzle 110*a* of the downwardly positioned head 110 toward the recording paper. In this second embodiment, as well as in the first embodiment, a half-etching treatment is preferably performed with respect to the second head-supporting plate 113*b* and the ink droplet guiding plates 502 in order to make greater the removal effect of water and ink.

Figure 5A:
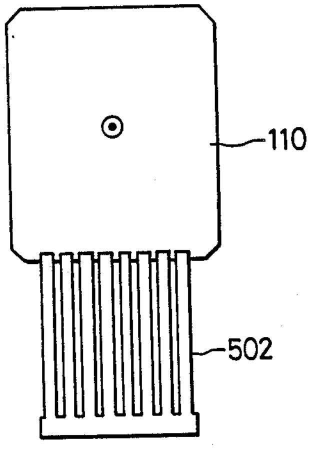
FIGS. 5A and 5B are illustrations of modified ink droplet guiding plates.
Figure 5B:
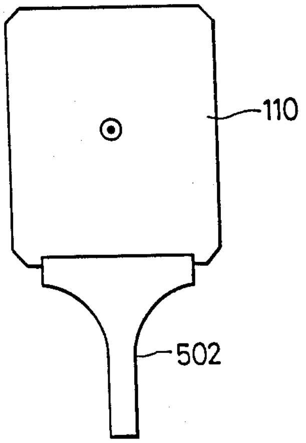

It should be understood that the foregoing relates to only preferred embodiments of the present invention, and that it is intended to cover all changes and modifications of the embodiments of this invention herein used for the purpose of the disclosure, which do not constitute departures from the spirit and scope of the invention. For example, it is also appropriate to use ink droplet guiding plates shown in FIGS. 5A and 5B. Furthermore, although in the above description the other end of each of the ink droplet guiding plates is in contact with the head-supporting plate.

What is claimed is:

1. An ink jet recording apparatus comprising:

a drum;

at least one ink jet printing head to be arranged to confront said drum for discharging ink toward recording paper wrapped around said drum, said ink jet printing head having an ink jet nozzle the opening of which is formed in the front surface of said ink jet printing head so as not to protrude from the front surface thereof;

a head-supporting plate fixedly secured to a housing of said ink jet recording apparatus to be in opposed relation of the outer surface to said drum and having a supporting opening for supporting said ink jet printing head so that it protrudes by a predetermined length from said head-supporting plate, toward said drum, said supporting opening of said head-supporting plate being defined to provide a through-hole below said ink jet printing head when said ink jet printing head is supported through said supporting opening; and an elongated member, one end of which is placed in contact with a lower portion of the front surface of said ink jet printing head and the other end of which is introduced through said through-hole into the rear side of said head-supporting plate so that ink puddled on the front surface of said ink jet printing head and the opening of said ink jet nozzle flows out downwardly.

2. An ink jet recording apparatus as claimed in claim 1, wherein said member is treated with half-etching.

3. An ink jet recording apparatus comprising:

a drum;

at least one ink jet printing head arranged to confront said drum for discharging ink toward recording paper wrapped around said drum, said ink jet printing head having an ink jet nozzle the opening of which is formed in the front surface of said ink jet printing head so as not to protrude from the front surface thereof;

first and second head-supporting plates which are fixedly secured to a housing of said ink jet recording apparatus to be substantially parallel to each other, a front surface of said first head-supporting plate being in opposed relation to the outer surface of said drum, said first and second head-supporting plates having respective head-supporting openings so that said ink jet printing head is kept through said head-supporting openings with the front surface of said ink jet printing head being in confronting relation to an outer surface of said drum and protruding by a predetermined length from the front surface of said first head-supporting plate, said first head-supporting plate having a through-hole positioned below said ink jet printing head; and an elongated member, one end of which is placed in contact with a lower portion of the front surface of said ink jet printing head and the other end of which extends so as to be introduced through said through-hole of said first head-supporting plate into a space between said first and second head-supporting plates so that ink puddled on the front surface of said ink jet printing head and said ink jet nozzle flows out downwardly along said elongated member.

4. An ink jet recording apparatus as claimed in claim 3, wherein the other end of said member is brought into contact with said second supporting plate after introduced through said through-hole of said first supporting plate.

5. An ink jet recording apparatus as claimed in claim 3, wherein said member is treated with half-etching.

6. An ink jet recording apparatus as claimed in claim 3, wherein said first plate is treated with half-etching.

* * * * *